(12) United States Patent
Nimmala et al.

(10) Patent No.: US 9,274,962 B2
(45) Date of Patent: Mar. 1, 2016

(54) APPARATUS, METHOD, AND SYSTEM FOR INSTANTANEOUS CACHE STATE RECOVERY FROM SPECULATIVE ABORT/COMMIT

(75) Inventors: Prashanth Nimmala, Beaverton, OR (US); Hamid-Reza S. Bonakdar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1280 days.

(21) Appl. No.: 12/961,767

(22) Filed: Dec. 7, 2010

(65) Prior Publication Data

US 2012/0144126 A1 Jun. 7, 2012

(51) Int. Cl.
*G06F 12/00* (2006.01)
*G06F 12/08* (2006.01)
*G06F 9/30* (2006.01)

(52) U.S. Cl.
CPC ............ *G06F 12/084* (2013.01); *G06F 9/3004* (2013.01); *G06F 9/30087* (2013.01)

(58) Field of Classification Search
CPC ... G06F 9/3806; G06F 9/3824; G06F 9/3848; G06F 9/3851; G06F 12/08
See application file for complete search history.

(56) References Cited

U.S. PATENT DOCUMENTS

| | | | |
|---|---|---|---|
| 6,065,103 A * | 5/2000 | Tran et al. ...................... 711/156 |
| 7,376,800 B1 * | 5/2008 | Choquette et al. ............. 711/147 |
| 8,195,898 B2 * | 6/2012 | Welc et al. ..................... 711/154 |
| 2002/0066005 A1 * | 5/2002 | Shibayama et al. .......... 712/218 |
| 2010/0023707 A1 * | 1/2010 | Hohmuth et al. ............. 711/152 |
| 2010/0174875 A1 * | 7/2010 | Dice et al. ..................... 711/152 |

* cited by examiner

*Primary Examiner* — Tuan Thai
*Assistant Examiner* — Mohamed Gebril
(74) *Attorney, Agent, or Firm* — Lowenstein Sandler, LLP

(57) ABSTRACT

An apparatus and method is described herein for providing instantaneous, efficient cache state recover upon an end of speculative execution. Speculatively accessed entries of a cache memory are marked as speculative, which may be on a thread specific basis. Upon an end of speculation, the speculatively marked entries are transitioned in parallel by a speculative port to their appropriate, thread specific, non-speculative coherency state; these parallel transitions allow for instantaneous commit or recovery of speculative memory state.

21 Claims, 6 Drawing Sheets

Transitions on Commit of Processing Element 0

| | From | To |
|---|---|---|
| 401 | S+R0 | S |
| 402 | S+R1 | S+R1 |
| 403 | S+R0R1 | S+R1 |
| 404 | E+R0 | E |
| 405 | E+R1 | E+R1 |
| 406 | E+R0R1 | E+R1 |
| 407 | E+W0 | M |
| 408 | E+W1 | E+W1 |

Transitions on Abort of Processing Element 0

| | From | To |
|---|---|---|
| 411 | S+R0 | S |
| 412 | S+R1 | S+R1 |
| 413 | S+R0R1 | S+R1 |
| 414 | E+R0 | E |
| 415 | E+R1 | E+R1 |
| 416 | E+R0R1 | E+R1 |
| 417 | E+W0 | I |
| 418 | E+W1 | E+W1 |

FIG. 4

APPARATUS, METHOD, AND SYSTEM FOR INSTANTANEOUS CACHE STATE RECOVERY FROM SPECULATIVE ABORT/COMMIT

FIELD

This invention relates to the field of integrated circuits and, in particular, to improving speculative cache accesses and state recovery.

BACKGROUND

Advances in semi-conductor processing and logic design have permitted an increase in the amount of logic that may be present on integrated circuit devices. In fact, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel.

As the parallel nature of processors has increased so has the use of speculation (early execution of code; the results of which may not be needed). In conjunction with speculative execution, more parallel execution has resulted in difficulties regarding shared data synchronization. One recent data synchronization technique includes the use of transactional memory (TM). Often transactional execution includes speculatively executing a grouping of a plurality of operations or instructions, where tentative results are not made globally visible until a commit point of a transaction. As an example, multiple threads may execute within a data structure, and their memory accesses are monitored/tracked. If the threads access/alter the same entry, conflict resolution may be performed to ensure data validity. As part of the conflict resolution, a transaction is able to be aborted—returned to the state prior to starting execution of the transaction.

Very similar to transactional execution is a type of execution referred to as Hardware Lock Elision (HLE). Instead of speculatively executing a critical section demarcated by begin and end transaction instruction, HLE speculatively executes a critical section that is demarcated by lock and lock release instructions. Essentially, HLE elides—omits—the lock and lock release instructions and treats the critical section like a transaction. Although separate hardware may be utilized for critical sections detection and prediction, often similar transactional memory structures are utilized to support HLE.

In fact, a Hardware Transactional Memory (HTM) System usually includes hardware structures to support access tracking, conflict resolution, and other transactional tasks. As described above, speculative execution, whether being utilized for transactional execution, HLE, or traditional speculation, typically results in either a commit (use or making speculative results globally viewable) or an abort (discard or return of hardware to a previous state before speculation began). Yet, current hardware to support commit and aborts of speculative critical sections potentially incur significant penalties (a large number of cycles for transitioning from speculative to non-speculative states). For example, in a legacy cache memory to recover pre-speculation states, a legacy read port is utilized to read out speculative values, the values are operated on outside the cache array, then the modified values are written back through a legacy read port. In an illustrative example (during an abort of a critical section), it may take up to 512 cycles to recover the proper, pre-speculation memory state.

BRIEF DESCRIPTION OF THE DRAWINGS

The present invention is illustrated by way of example and not intended to be limited by the figures of the accompanying drawings.

FIG. 4 illustrates an embodiment of a table illustrating transitions from thread 0 speculative states to thread 0 non-speculative states upon a commit and an abort

DETAILED DESCRIPTION

In the following description, numerous specific details are set forth, such as examples of specific types of specific processor configurations, specific cache configuration, specific hardware structures, specific speculative port implementations, specific speculative port circuits, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described algorithms, specific cache memory details, specific cache control logic implementations and other specific operational details of processors haven't been described in detail in order to avoid unnecessarily obscuring the present invention.

The method and apparatus described herein are for providing instantaneous, efficient cache state recovery upon a speculative abort/commit. Specifically, instantaneous cache state recovery is discussed in regards to an exemplary type of execution—hardware transactional execution—that utilizes speculative aborts/commits. Yet, the apparatus' and methods described herein are not so limited, as they may be implemented in conjunction with any cache memory that is to restore a coherency states instantaneously. For example, the apparatus and methods may be utilized with Hardware Lock Elision or other speculative execution.

Figure 1:
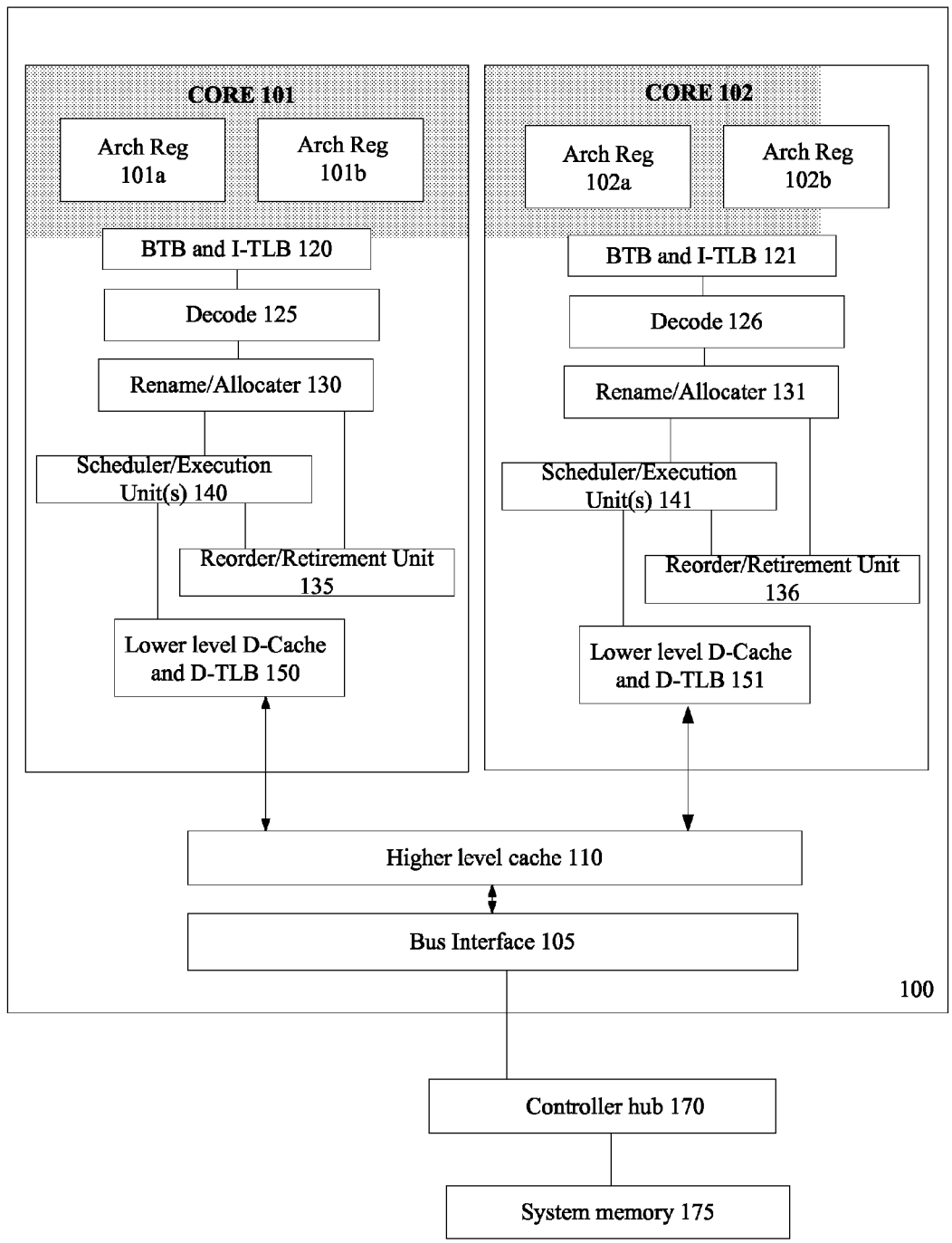
FIG. 1 illustrates an embodiment of a logical representation of a multiprocessing element processor.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102, which may include asymmetric cores or symmetric cores (illustrated embodiment). However, processor 100 may include any number of processing elements that may be symmetric or asymmetric.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific, new instructions, such as a conditional commit instruction and/or a speculative checkpoint instruction. As a result or the recognition by decoders 125, the architecture or core 101 takes specific, predefined actions to perform tasks associated with the appropriate instruction.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages. As discussed in more detail below, cache 150, in one embodiment, is adapted to track speculative accesses (reads and writes) to its cache lines by processing elements (cores and/or threads) that share access to the cache. For example, as illustrated cache 150 tracks speculative reads and writes from thread units 101a and 101b. And is additionally adapted to provide efficient state recovery upon end of speculative execution by one of the two thread units 101a, 101b.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

In one embodiment, processor 100 is capable of hardware transactional execution, software transactional execution, or a combination or hybrid thereof. A transaction, which may also be referred to as a critical or atomic section/region of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly language include operation codes (op-codes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least primarily through execution of software code. In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures, resources, and implementations are disclosed for illustrative purposes. Yet, it should be noted that these structures and implementations are not required and may be augmented and/or replaced with other structures having different implementation details.

As a combination, processor 100 may be capable of executing transactions within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. Furthermore, it is important to note that the same hardware may also be utilized to support and accelerate a pure STM system.

In another embodiment, processor 100 is adapted to support Hardware Lock Elision (HLE). Instead of a demarcated transaction, a critical sections is detected, predicted, or identified by potential lock and lock release instructions. Essentially, legacy critical sections that required exclusive access are executed in a similar manner to transactions (speculatively with tentative results not being made globally visible until an end of the critical section). As can be seen, during execution of a critical section using HLE, cache 150 may similarly be used to track speculative accesses from thread units 101a, 101b.

Therefore, in one embodiment, cache 150 is adapted to efficiently recover and/or commit speculative cache state. As described above, whether during traditional speculative execution, transactional execution, or HLE, a point in the execution is reached where speculative results are either correct or incorrect. For traditional speculative execution, this may include a point where a conditional branch that was speculatively executed is actually taken (speculative execution is correct and the results are to be utilized) or where a mis-speculation event occurs, such as a conditional branch is not taken (speculative execution is incorrect and the results are to be discarded). In a transactional memory or HLE scenario, the point may include a commit (speculative execution is valid and the results are to be made globally visible) or an abort (speculative execution is not valid and the results are to be discarded). Consequently in this example, cache 150 is to efficiently transition speculative coherency states of speculatively accessed cache lines to non-speculatively states (with respect to the processing element ending speculation). Note that these transitions may be to pre-speculative states (states of cache lines before the start of speculation) or to a post-speculation, non-speculative state (states of tentative, speculative cache lines after commit).

Today, a majority of the processor cache memories utilize a version of a Modified Exclusive Shared and Invalid (MESI) cache coherency protocol. So, a cache entry is marked with one of the MESI coherency state. In addition, speculative storage may also be associated with the MESI coherency states to indicate if the cache entry has been speculatively accessed. And in one embodiment, the speculative storage may even indicate which processing element (thread or core) performed the speculative access. Then, when an end of speculation event is encountered, the speculative coherency state is quickly and efficiently transitioned to the appropriate non-speculative MESI state.

In one embodiment, a quick and efficient transition to proper MESI states includes parallel migration of all entries in cache 150 that were speculatively accessed to the appropriate non-speculative state. Note that the migration of such entries may be processing element specific. And they may be performed 'instantaneously' (within a single cycle), instead of the legacy method of reading out all coherency and speculative values, operate on them separately outside the array sequentially, and then writing back the results.

For example, assume both thread units 101a and 101b are executing speculative critical sections. As each of threads 101a, 101b access cache lines in cache 150, the cache lines are marked speculative with respect to the thread that performed the access. So, there will be four possible categories of cache lines in cache 150 in this scenario: (1) non-speculatively accessed cache lines that retain a non-speculative MESI coherency state because they were not accessed by threads 101a, 101b; (2) speculatively accessed cache lines by thread 101a and not by thread 101b; (3) speculatively accessed cache lines by thread 101b and not by thread 101a; and (4) speculatively accessed cache lines by both threads 101a, 101b.

Upon an end speculation event for thread 101a, such as a commit instruction or lock release instruction, two categories of cache lines (speculatively accessed cache lines by thread 101a and not by thread 101b and speculatively accessed cache lines by both threads 101a, 101b) are transitioned to appropriate thread 101a non-speculative MESI coherency states. Note that a thread specific transition in the later case (cache lines speculatively accessed by both threads 101a, 101b) may leave an entry speculatively marked from the perspective of thread 101b. But from the perspective of thread 101a, which was associated with the end of speculation event, the cache lines are non-speculative. So, multiple speculative entries may be instantaneously transitioned in parallel to their appropriate non-speculative coherency state.

It is also important to note that the transitions between states, in one embodiment, include heterogeneous types of transitions. For example, assume thread 101a speculatively read cache line 1 leaving it in a thread 101a speculative shared coherency state and speculatively wrote to cache line 2 leaving it in a thread 101a speculative excusive coherency state. When an end speculation event is encountered on thread 101a, both cache line 1 and cache line 2 are transitioned to non-speculative states. In this scenario, regardless of the end speculation event (commit or abort), cache line 1 is transitioned from the thread 101a speculative shared coherency state to a thread 101a non-speculative shared coherency state. Note that if thread 101b speculatively read from cache line 1, the transition in response to the end of speculation event from thread 101a does not affect the speculative nature of cache line 1 with regard to threads 101b. In other words, the transition would essentially be from a thread 101a and 101b speculative shared state to a thread 101b speculative shared state and a thread 101a non-speculative shared state. Furthermore, if the end speculation event is a commit, cache line 2 is transitioned from the thread 101a speculative excusive coherency state to a thread 101a non-speculative modified coherency state. Or if the end speculation event is an abort, cache line 2 is transitioned from the thread 101a speculative excusive coherency state to a thread 101a non-speculative invalid coherency state.

As can be seen from the example above, when speculation ends multiple cache lines with cache 150 may be heterogeneously transitioned from different speculative MESI coherency states to the appropriate pre (abort) or post (commit) speculation state in parallel and instantaneously; this results in a simple, high-performance hardware solution to support speculative execution and significantly mitigate speculation penalties due to cache state recovery. The discussion above has been primarily in reference to a lower level cache (cache 150), but it may be similarly applied to any level cache or memory. Additionally, the discussion above and below focuses on MESI coherency states, because of their prevalent use in the industry. But any coherency model for memory may be utilized in conjunction with the transition apparatus and methods described herein. Essentially, instead of efficiently transitioning between speculative MESI states to non-speculative MESI states, the efficient transition could be between any speculative memory state to a non-speculative memory state.

Moreover, FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type. And FIG. 1 illustrates an embodiment of processor that is coupled in a point-to-point fashion with an interface to an external memory controller (controller hub 170). However, many current processors have begun including an on-processor memory interface module—an on-chip module—with a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor. As a result, it is important to note that the apparatus' and methods described herein may be utilized with any configuration of processor utilizing memory to hold speculative results.

Figure 2:
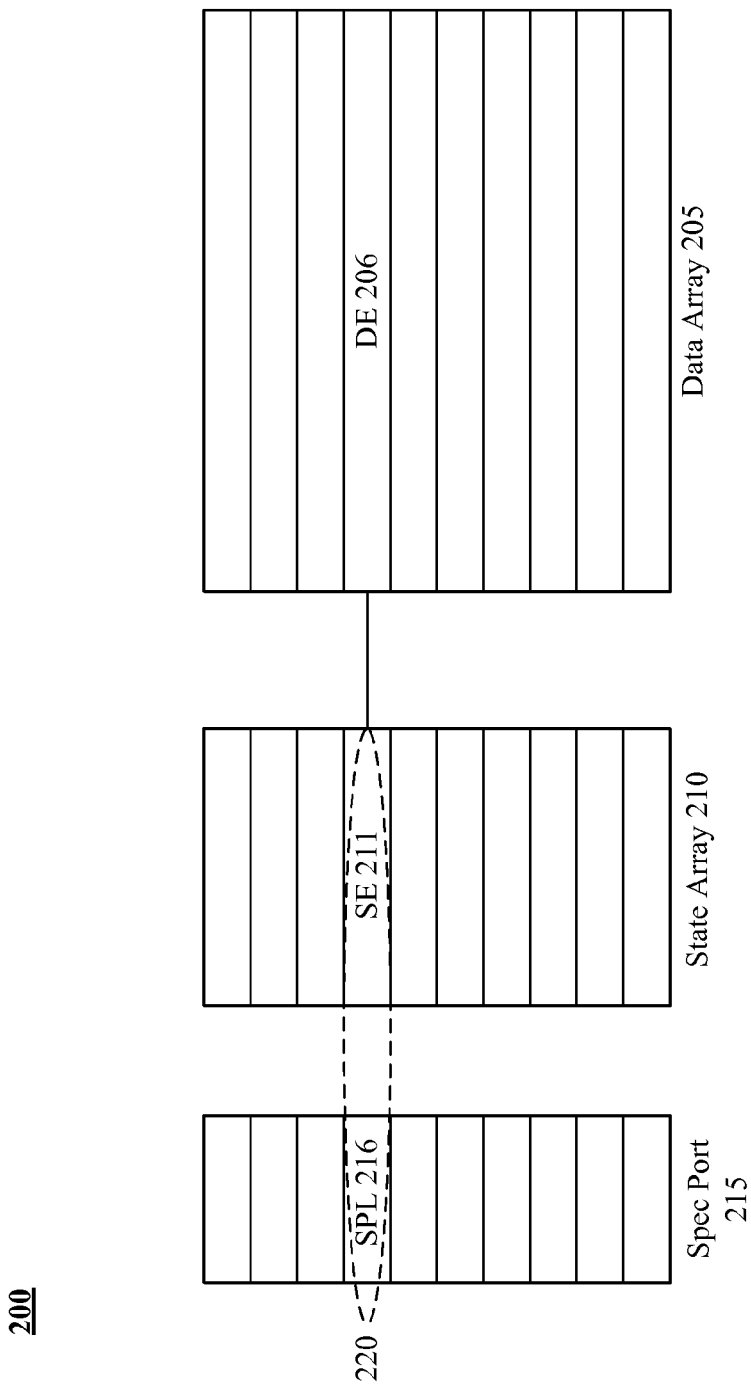
FIG. 2 illustrates an embodiment of a cache memory adapted to support efficient state transitions for speculative execution.

Turning to FIG. 2, an embodiment of a cache memory adapted to perform efficient state recovery from speculative execution is depicted. As illustrated, cache memory 200 includes data storage (data array 205), state storage (state array 210), and speculative port 215. Data array includes a plurality of entries, such as data entry 206, to hold cacheable data, such as recently used operands/instructions. Although array 205 is referred to as a data array, which is most often associated with a data cache, cache memory 200 may include an instruction cache, where array 205 holds fetched instructions, decoded instructions, and/or decoded traces. Data array 205 may be organized in any manner, such as a fully associative cache, a set associative cache, a direct mapped cache, or other known cache organization. For example, in a set associative cache, the data array is broken into multiple ways with each cache line of the same offset within a way forming a set. Therefore, a data entry may refer to any level of granularity within memory, such as a number of bits within a cache line, an operand within a cache line, a cache line, a set, or other known access level of a memory device.

State storage 210 is associated with data array 205. In one embodiment, this association includes associating a state entry with each data entry of data array 205. In this scenario, state array 210 takes on the same organization as data array 205. However, similar organization is not required, as any known method of corresponding one entry to another may be used. In the depicted embodiment, state entry 211 is associated with data entry 206. Here, state entry 211 is adapted to hold a 'state' (information representing the status/condition of date entry 206). Examples of such state include coherency information (information to maintain shared data consistency), usage information (indication of data usage for replacement), and characteristics of data in the data entry (speculative or non-speculative nature of the data).

In one embodiment, to denote coherency states, entry 211 includes storage cells to hold bit values (logical values) that represent different coherency states for data held in entry 206. One of the more common coherency protocols includes a Modified Exclusive Shared Invalid (MESI) cache coherency protocol. Although there are only four possible states in this protocol, some processors, such as recent Intel Architecture processors, include as many as three bits to represent these legacy coherency states. And although a MESI protocol is discussed in more detail below to illustrate uses of the apparatus' and methods described herein, any known coherency protocol or coherence states that describe characteristics of data may be used, as well as any number of storage structures/cells to represent them.

In one embodiment, state entry 211 further includes speculative storage cells to represent a speculative nature of data entry 206 in a similar manner as coherency bits indicate the coherency state of data entry 206. As an example, state entry 211 includes speculative storage cells to track speculative reads and writes from processing elements that share access to cache memory 200, such as multiple threads (101a, 101b) that share access to a low level data cache (150) or multiple threads/cores (threads 101a, 101b, 102a, and 102b/cores 101 and 102) that share access to a higher level cache (110).

Essentially, in this example, each data entry, such as data entry 206, is marked as speculatively accessed upon a speculative access from a processing element. The speculative tracking may be as generic as a single bit to indicate data entry 206 has been speculatively accessed. Or the tracking may be as specific to include bits that indicate whether data entry 206 was speculatively read or written, as well as which processing element performed such a read or write. In the more specific scenario, a read storage cell may be associated with each processing element, such as a first read storage cell corresponding to thread 101a and a second read storage cell corresponding to thread 101b. When thread unit 101a speculatively reads data entry 206, the first read storage cell corresponding to thread 101a is set (updated to a logical, marked, or speculative value) to represent the speculative access by thread 101a occurred.

In a similar manner, a speculative storage cell may be included to track speculative writes. Note that a single write bit to track whether data entry 206 has been speculatively written may be sufficient in an optimistic read system, since only one thread should be speculatively writing to a data entry. Yet, a write cell per thread may alternatively be used to track speculative writes from individual processing elements.

Here, the combination of a coherency value with a processing element specific, speculative value (an indication of speculative state corresponding to a specific processing element) may be referred to as a specific processing element speculative coherency value. For example, when state entry 211 holds a logical bit pattern of 001001 it represents a shared MESI coherency state (bits[2:0]) and that processing element 0 (thread unit 101a) speculatively read from data entry 206 (bits[5:3]). In this scenario, state entry 211 includes six storage cells (bits[2:0] for a MESI coherency state and bits[5:3] for speculative tracking. Specifically, using cache 150 as an example, bit 3 includes a storage cell corresponding to processing element 101a to indicate whether a speculative read from thread 101a has occurred, bit 4 includes a storage cell corresponding to processing element 101b to indicate whether a speculative read from thread 101b has occurred, bit 5 includes a storage cell to indicate whether a speculative write to corresponding data entry 206 has occurred.

However, speculative coherence tracking is not limited to such a specific embodiment. Instead, any known apparatus or method for representing coherency and speculative states may be utilized. As another illustrative example, a state entry may include an additional storage cell to delineate which processing element speculative wrote to a data entry. And as can be inferred from the examples above, the number of bits may change as the number of processing elements change. For example, if four threads share access to cache 200, four read and four write bits may be utilized to track the speculative nature of reads and writes from specific threads. And when thread specific speculative tracking values are utilized, the state transitions discussed below may also be thread specific.

For example, assume state entry 211 represents that both threads 101a, 101b have speculatively read from data entry 206 and an end speculation event is encountered from thread 101a. In that scenario, the state transition is two-fold: a coherency transition (a shared coherency state of 001 remains the same) and a speculative tracking transition (speculatively read by threads 101a,101b of 011 to speculatively read by thread 101b of 010). It can be said in this illustration that the transition from the perspective of thread 101a includes a transition from a first processing element (thread 101a) speculative accessed coherency value (011001) to a first processing element non-speculatively accessed coherency value (010001), since the speculation bits are updated to represent that the data is no longer considered speculatively read by thread 101a, even though the data entry remains speculatively marked from the perspective of thread 101b.

In one embodiment, cache memory 200 includes a speculative port, such as speculative port 215, to affect such transitions. As one example, speculative port 215 is coupled/associated with each entry in state entry in state array 210, so speculative port 215 is able to transition multiple (or all) state entries in parallel. In fact, in one embodiment, speculative port 215 is adapted to transition up to all of the state entries within one cycle (a period of a clock associated with cache memory 200). From the discussion above, it can be seen that the criteria for determining which entries of state array 210 to transition may vary. However, in one embodiment, all entries in array 210 marked as speculatively accessed by a processing element (all entries holding a first processing element speculative value, such as xx1xxx) are transitioned in parallel by speculative port 215 to a first processing element non-speculative value in response to an end of speculation event associated with the first processing element. Essentially, in this instance speculative port 215 provides hardware to quickly and efficiently transition speculative state entries to non-speculative states on a processing element specific basis.

In one embodiment, a speculative port 215 includes speculative port logic 216 to perform the speculative state transitions for state entry 211. Speculative port logic 216 may include read modify write (RMW) hardware logic to perform an atomic read, modify, and write operation on state information from state entry 211. Note that the read, modify, and write may each independently operate on all or a portion of the information held in state entry 211. In one scenario, speculative port logic may read out both the speculative tracking values/information and the coherency values/information from state array 210, modify both values, and then write back both new, modified values to state entry 211. In another scenario, speculative port logic 216 modifies/operates on the coherency values/information held in state entry 211 based on a read (inputs from) the speculative tracking values held in state entry 211. Here, the speculative port logic includes the algorithm logic to modify the coherency value based on what is held in the speculative values in state entry 211 and the end of speculation event.

Whether the speculative port logic reads and/or operates on all of state entry 211, in one embodiment, speculative port 215 implements a master-slave topology (an old value is held while a new value is modified/written). For example, in the case where all of state entry 211 is read out, modified to a new value, and written back to entry 211, the master-slave topology includes the holding of the old state (speculative value plus coherency value) in state entry 211, while speculative logic 216 is modifying the old value to the new value. In the case where the coherency value within state entry 211 is operated on based on the speculative value in state entry 211, the speculative port logic 215 may be adapted to open the read portion of the circuit to read and operate on the speculative value to modify the coherency value. And then subsequently, another portion of the circuit is opened to update the speculative value. This type of master-slave implementation may be useful in the state transitions, such as a single cycle transition, so the update of the speculative value doesn't cause an erroneous, additional updates of the coherency value based on a newly updated speculative value.

As depicted, the speculative port logic 216 may be replicated for each state entry in state array 210, where the logical combination of the speculative port logic for each state entry viewed as a whole forms speculative port 215. Here, the parallel transition of multiple state entries includes the operation of multiple speculative port logic groups (like speculative port logic 216) operating on corresponding state entries (like state entry 211) in parallel. Furthermore, the delineation between speculative port logic 216 and state entry 211 may be blurred (logic from each may cross the other's physical boundaries), which is why the combination 220 illustrates a logical association of speculative port logic 216 with state entry 211. For example, the speculative storage associated with speculative access tracking may be physically located in a grouping with the speculative port (algorithm) logic 216. Or inversely, the speculative port logic 216 may be physically located at each state entry of the state array. Regardless of the location, the speculative port hardware includes any hardware to cause the transition of speculative tracking and cache coherence, as described above.

Figure 3:
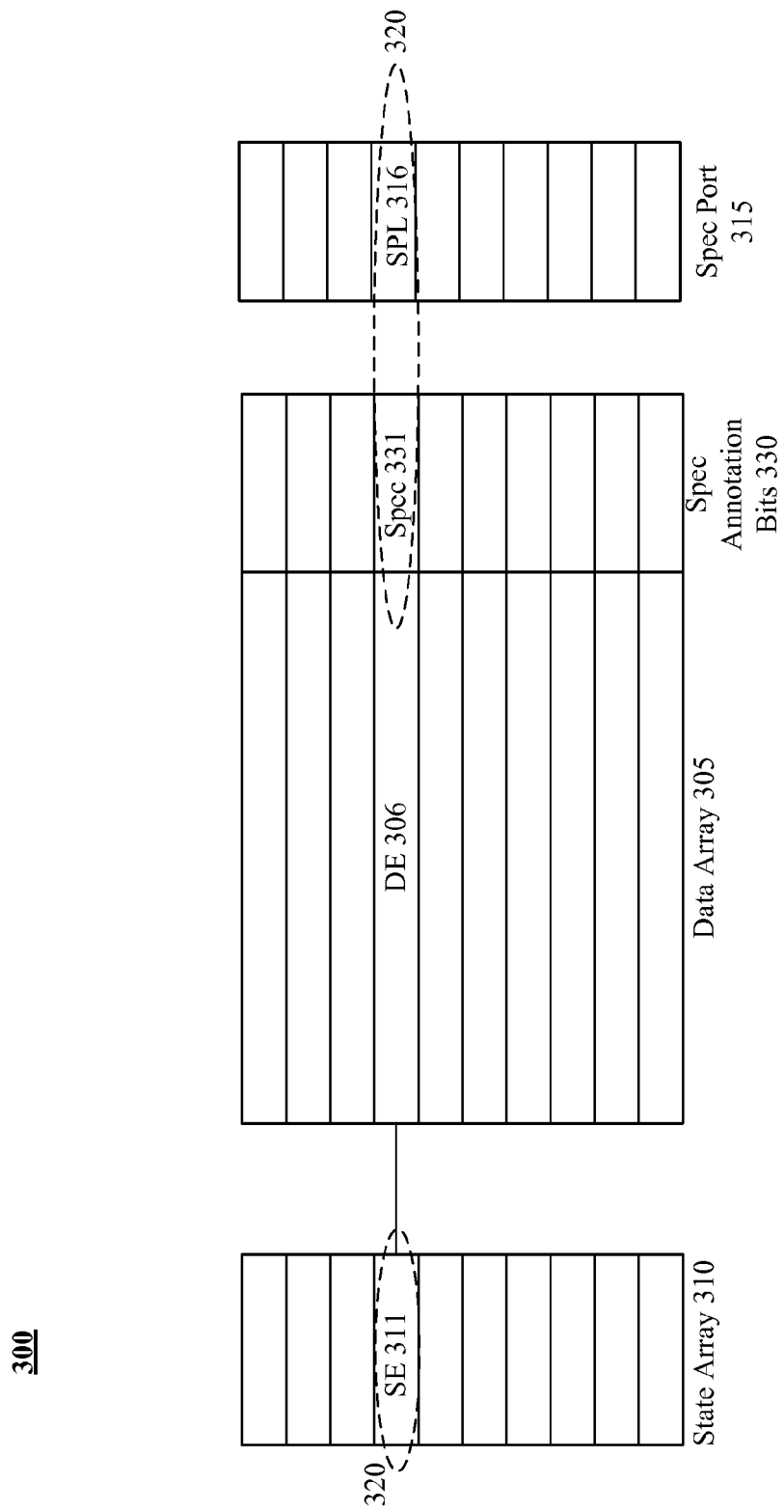
FIG. 3 illustrates another embodiment of a cache memory adapted to support efficient state transitions for speculative execution.

In fact, to illustrate such a different configuration for speculative port logic, FIG. 3 depicts an embodiment of a cache memory with a different distribution of speculative tracking and speculative port logic. Here, speculative storage is included as speculative annotation bits 330 that are part of data array 305. The speculative bits as shown may be persistent (included with the data throughout the memory hierarchy) or non-persistent (transient values that are local to cache 300). And they may operate in a similar manner as speculative tracking from FIG. 2, tracking speculative reads and writes to data array 305. Additionally, state array 310 includes state entry 311, which is to hold traditional coherency information. Speculative port logic, in this illustration, operates on speculative annotation bits 331 and coherency information 311 to provide instantaneous speculative state transitions, as described above. Logical association 320 demonstrates the distribution of components that provides the same functionality as logical association 220 from FIG. 2. Beyond the specific implementation, FIG. 3 also illustrates that state information, speculative tracking, and speculative port transitions may be implemented in a variety of different ways.

In a return to FIG. 2 and as eluded to above, determining which entries of state array 210 to transition in parallel may depend on any number of factors (speculative marking of data entry 206 in state array entry 211, which processing element speculatively accessed data entry 206, the type of end of speculation event, which processing element the end of speculation event is associated with, etc.). Regardless, in one embodiment, the speculative state transitions (also referred to as state recovery or speculative recovery) are performed in response to encountering an end of speculation event. During typical speculative execution an end of speculation event may include any event associated with an end of speculative execution or an indication that the speculative results are not needed, i.e. the speculative results are incorrect. Similarly, during transactional execution or execution of a critical section using HLE, an end of speculative execution event may include: a commit critical section instruction/operation to commit speculative execution of a critical section; an abort operation/instruction to abort speculative execution of a critical section; an asynchronous abort event (such as an Input/Output (I/O) access or other irrevocable event) to abort speculative execution of the critical section, a commit critical section event (detecting a lock-release instruction during HLE to end the critical section), or an abort critical section event (detecting a data conflict or not detecting a lock-release instruction before expiration of an HLE timer).

As a corollary to performing speculative state transitions in response to an end of speculation, in one embodiment, a processor, such as processor 100, includes end hardware logic adapted to detect an end of speculation (i.e. an end of speculative execution event). For example, in the scenario where the end of speculation event includes an instruction (commit, abort, or other instruction), the end logic includes some stage of the processor pipeline, such as decode logic that is adapted to recognize and decode the end instruction as part of a predefined Instruction Set Architecture (ISA) for a type of processor 100 or execution logic to actually execute the instructions or decoded operations thereof.

Either in conjunction with instruction detection logic or as an alternative, other logic may be included to detect asynchronous events (events not specifically tied to an instruction). As an example, an abort of a hardware transaction is initiated when cache control logic, through cache coherency protocol, detects a write from a conflicting thread (thread 101*b*) to a data entry (data entry 206) that has been speculatively (transitionally) read by another thread (thread 101*a* as indicated by state entry 211). In this case, the cache coherency protocol logic combined with state entry 211 may be considered end speculation hardware to detect the end of speculative execution. To provide another illustration, assume a critical section is being executed by HLE hardware (hardware adapted to elide lock instructions that are predicted to start critical sections along with the speculative marking hardware to track speculative accesses to cache 200). Just as above, a data conflict during such execution may cause an abort. And additionally, if a matching lock release instruction is not found within a certain amount of time, the critical section may be aborted or a late-lock acquire may be initiated to execute the critical section non-speculatively with locks. Either way, the halt of speculative execution may be referred to as an end of speculation with the hardware involved in the halt being considered the end logic described above. Moreover, when a path of a conditional branch is speculatively executed, and the actual branch instruction being resolved (the speculative branch is taken or not taken) may be considered an end of speculation, where hardware to detect the instruction execution or other event associated therewith may be considered end of speculation detection hardware.

Referring now to FIG. 4, an illustrative embodiment of state transitions based on abort and commit end of speculation events are depicted. Table 450 depicts transitions from processing element 0 speculative coherency states to processing element 0 non-speculative coherency states in response to a commit event associated with processing element 0. For discussion, the state transitions will be discussed in reference to FIGS. 1 and 2, such that processing element 0 refers to thread 101*a*, processing element 1 refers to thread 101*b*, threads 101*a*, 101*b* share access to cache memory 150, states are to be held in state entry 211 for corresponding data entry 206. Looking closer at table 450, the 'from' column includes potential speculative states, such as: row 401 with a speculatively read by thread 101*a* (R0) and shared coherency state (S); row 402 with a speculatively read by thread 101*b* (R1) and shared coherency state (S); row 403 with a speculatively read by thread 101*a* (R0) and thread 101*b* (R1) and shared coherency state (S); rows 404-406 with an exclusive coherency state and different readers (threads 101*a*, 101*b*, and 101*a*, 101*b*, respectively); and rows 407, 408 with an exclusive coherency state and different writers (threads 101*a* and 101*b*, respectively).

The 'to' column represents the post-transition thread 101*a* non-speculative state in response to a commit event associated with thread 101*a*. For example, row 403 starts in a speculatively read by thread 101*a* (R0) and thread 101*b* (R1) with shared (S) coherency state. And in response to the commit, the state is transitioned to speculatively read by thread 101*b* and shared coherency state. Note that since the final state does not include thread 101*a* as a speculative reader, the state is non-speculative with regard to processing element 101*a*. One entry of interest to discuss is row 407, which represents that thread 101*a* speculatively wrote to associated data entry 206. During execution of a critical section, speculative writes should be forwarded to the local processing element (thread 101*a*) to provide proper execution within the local thread, while the speculative writes should not being forwarded globally. Often this is accomplished through providing the appropriate miss or invalid response to a cache snoop from a global thread, when the speculative write bit for thread 101*a* is set. Yet, upon a commit, the newly written value is to be made globally visible. As a result, the speculatively written by thread 101*a* and exclusive coherency state is transitioned to a non-speculative modified state. And according to the normal MESI coherence protocol, the new data value will be globally promulgated as the most recent value for the associated data address.

Differing slightly is table 460, which illustrates exemplary state transitions upon an abort event of thread 101*a*. Essentially, the goal upon a commit is to enable the data to be globally visible as efficiently as possible, while the focus of an abort is a return to the memory state before starting speculative execution. Note that the major difference between tables 450, 460 exists in row 417. Here, the post-transition state includes a non-speculative invalid state, instead of the modified state. So, if a subsequent snoop is received, the speculatively updated value will not be incorrectly provided (instead a miss response will be provided and the correct, pre-speculation value may be obtained from a higher level memory).

Although the discussion of FIG. 4 has been in reference to state transitions upon a commit and abort event, which are typically associated with execution of critical sections, the transitions may be similarly applied in regards to any type of speculative execution. For example, assume normal speculative execution of a conditional branch. If the branch is taken, i.e. the results are to be used, the transitions may be similar to a commit (speculatively exclusive states are transitioned to non-speculatively modified states). And if the branch is not taken, the state transitions are similar to an abort, where speculatively exclusive states are transitioned to non-speculatively invalid states. As a more general note, the state transitions are not limited to MESI coherency states, as they may include any form of coherency states that make data globally available for commit type events and invalid for abort type events.

Figure 5:
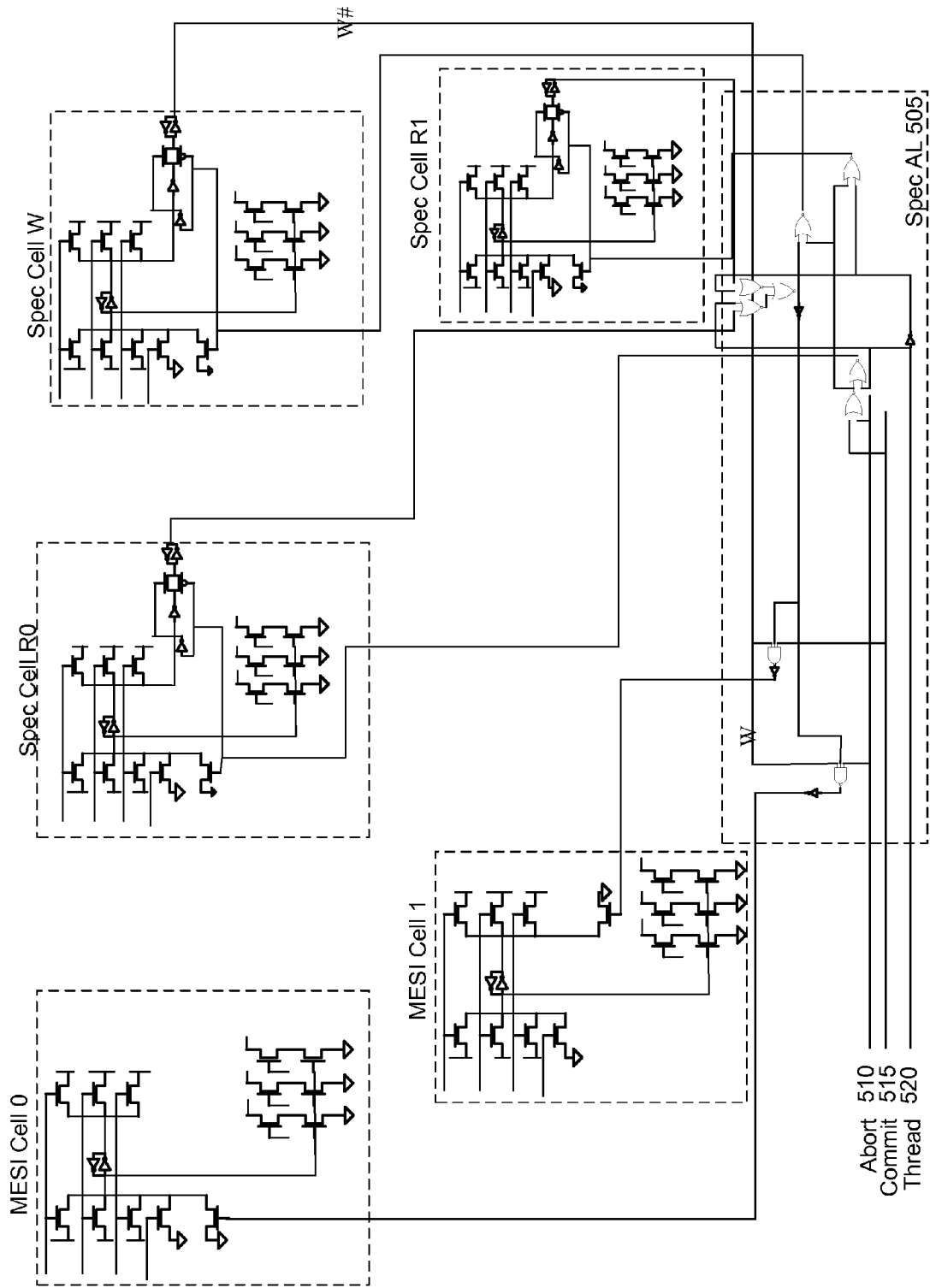
FIG. 5 illustrates an embodiment of speculative port logic adapted to provide efficient state recovery upon the end of speculation.

Referring next to FIG. 5, an embodiment of speculative port logic adapted to provide efficient state recovery upon the end of speculation is illustrated. As depicted two legacy cells (MESI 0 and MESI 1) are included to represent one of the four MESI cache coherency states. Additionally, three speculative storage cells (speculative cell R0, speculative cell R1, and speculative cell W are further provided. In the depiction, two read storage cells are provided for two processing elements (one read storage cell for each processing element that shares access to the cache). However, as stated above, any coherence mechanism may be utilized in conjunction with any type of storage for tracking speculative accesses. Additionally, the storage cells may be associated with any known cache structures, such as MESI cells 0,1 and speculative cells R0, R1, and W with a state entry of a cache state array.

In one embodiment, a speculative port includes speculative algorithm logic (SAL), such as SAL 505, associated with the coherency and speculative storage structures. Here, SAL 505 is to modify coherency storage (cells 0,1) based on the values of the speculative storage (cells R0, R1, and W). Referring momentarily back to FIG. 4, it can be gleaned that the final transition states in column 'to' within tables in flow 615 are dependent on the speculative values, not the current coherency state. For example, if R0 is set and W0 is not set upon a commit of thread 0, then the final non-speculative coherency state will be a shared state with R0 reset to indicate the tracking state is non-speculative for thread 0. Furthermore, if W0 is set and there is a commit event from thread 0, then the post-transition state will include a modified coherency state and a non-speculative value for R0. Inversely, if W0 is set to a speculative value and there is an abort event from thread 0, then the post-transition state includes an invalid state and a non-speculative value for W0. Note that in this scenario, a speculative event from one thread doesn't affect the speculative nature of the other thread.

Converting the above discussion to FIG. 5, it can be seen that an abort 510 or commit 515 (end speculation event) from thread 0, as indicated by thread signal 520, utilizes the state of speculative cell R0 and speculative cell W (thread speculative value) to update MESI cell 0. And subsequently, the speculative nature of the speculative cells (R0,W) are also updated to reflect a thread specific non-speculative state. As referred to above, in one embodiment, upon an end speculation event, the speculation port transitions multiple state entries, including similar cells 0,1, R0, R1, and W, are instantaneously.

Therefore, in one example, the illustrated logic is operated in a master-slave manner. Here, speculative storage cells R0, R1, and W are read by speculative algorithm logic 505. And MESI cells 0,1 are updated by speculative algorithm logic 505 based on the current speculative storage cell values. Then, the speculative storage cells R0, R1, and W, which are still holding the current values are subsequently updated, while MESI cells 0,1 are inactive. As a result, multiple updates (a first update before speculative storage cells are updated and an erroneous second update after speculative storage cells are updated before a cycle ends) of MESI cells 0,1 based on the old and new speculative storage cells R0, R1, and W are potentially avoided. Essentially, the master-slave topology allows new values to be evaluated in the master during speculative port activation, while the slave continues to hold the old value. And upon recovery port de-assertion, both master and slave are synced up.

As aforementioned, the transition of states, in the depicted scenario, is based on the speculative values and the end speculation event. For example, the same speculative value (speculatively written by thread 0) results in a coherency state of modified for a commit operation (commit signal 515) and a state of invalid for an abort operation (abort 520). Note that commit and abort are often considered mutually exclusive for critical sections. As a result, a single end speculation line may be used, where one logic level indicates an abort and another logic level indicates a commit. In addition, thread signal 520, in one embodiment, indicates which thread (0 or 1) a commit or abort assertion is associated with. Moreover, it may be noted that assertion of a commit or an abort by one thread, such as thread 0, may not affect the speculative state of another thread, such as a thread 1 commit not updating speculative cell R1 even though a coherency state is changed.

Figure 6:
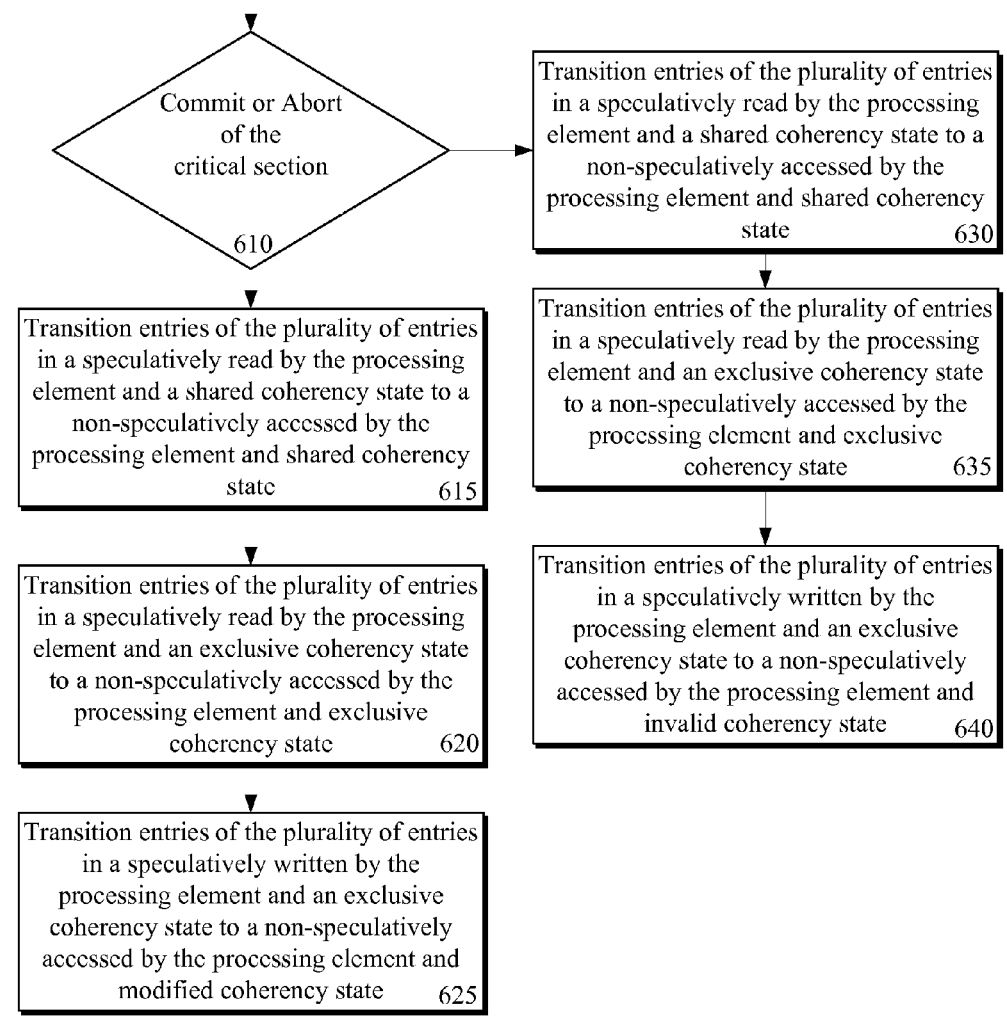
FIG. 6 illustrates an embodiment of a flow diagram for a method of transitioning speculatively marked entries to non-speculative states at the end of speculation.

Turning next to FIG. 6, an embodiment of a flow diagram for performing efficient speculative state transitions is illustrated. Although the flows of FIG. 6 are illustrated in a substantially serial fashion, they may differ in order, as well as be performed in parallel. For example, in one embodiment, state transitions are made in parallel, such as all within a single cycle. In this scenario, the flows of 615-625 and 630-640 are performed in parallel. In flow 605, a plurality of entries of a cache memory are marked as speculative in response to a processing element (hardware thread, core, and/or software thread) accessing the plurality of entries during speculative execution, such as execution of a critical section, a conditional branch, or other known speculative code. As an example, such marking is performed through setting a transaction read bit for each of the plurality of entries speculatively read by the processing element and setting a transaction write bit for each of the plurality of entries speculative written by the processing element.

In decision flow 610, it's determined if a commit (results of speculation are correct and to be made globally visible) or an abort (results of speculation are incorrect and are not to be made globally visible) associated with the speculative execution has occurred. As state above, such an event may include an instruction or other event indicating an end to speculation. In response to the end of speculation, the plurality of entries are transitioned, in parallel, from a speculative coherency state to a non-speculative coherency state with respect to the processing element.

Note that the transitions may be according to the tables illustrated in FIG. 4. For example, upon a commit event, a first number of the plurality of entries are transitioned from a speculatively read by the processing element and shared coherency state to a non-speculatively accessed by the processing element and shared state in flow 615, a second number of the plurality of entries are transitioned from a speculatively read by the processing element and exclusive coherency state to a non-speculatively accessed by the processing element and exclusive coherency state in flow 620, and a third number of the plurality of entries are transitioned from a speculatively written by the processing element and exclusive coherency state to a non-speculatively accessed by the processing element and modified coherency state in flow 625. Additionally, the transition to a non-speculative state with regard to one processing element may also include maintaining a speculatively read by an additional processing element and shared coherency state within the non-speculatively access by the processing element and shared state In contrast to a commit, upon an abort event, the same transitions from 615 and 625 occur in flows 630 and 635, while the third number of the plurality of entries are instead transitioned from the speculatively written by the processing element and exclusive coherency state to a non-speculatively accessed by the processing element and invalid coherency state in flow 640. As a result, any entries that were speculatively written within a critical section that is now being aborted are updated to invalid, so the incorrect results are not promulgated through the memory hierarchy. Yet, since the old values are still held higher in the memory hierarchy, by invalidating lines that were speculative written in parallel, the memory state is effectively and efficiently transitioned to a pre-speculation state instantaneously.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising: a cache memory including data storage including a first data entry and a second data entry;
   state storage associated with the data storage, the state storage including a first state entry to hold a first processing element speculative value to indicate a first processing element has speculatively accessed the first data entry and a second state entry to hold the first processing element speculative value to indicate the first processing element speculatively accessed the second data entry, wherein the state storage further comprises a coherency storage structure to hold a coherency state for the first state entry and for the second state entry, and a speculative storage structure to hold speculative values of the first state entry and for the second state entry; and
   a first speculative port operatively coupled to the first state entry and a second speculative port operatively coupled to the second state entry, the first and second speculative ports including speculative algorithm logic to:
      transition the first and second state entries from the first processing element speculative value to a first processing element non-speculative value in one cycle in response to an end of speculative execution event associated with the first processing element;
      modify the coherency storage structure to hold a coherency value based on the first processing element speculative value and the end of speculation execution event; and
      write the first processing element non-speculative value to the speculative storage structure, wherein the combination of the coherency value held in the coherency storage structure and the first processing element non-speculative value held in the speculative storage structure forms the first processing element non-speculative value.

2. The apparatus of claim 1, wherein the end of speculative execution event associated with the first processing element includes an event selected from a group consisting of:
   encountering a commit critical section operation to commit speculative execution of a critical section;
   encountering an abort operation to abort speculative execution of a critical section;
   detecting an asynchronous abort event to abort speculative execution of the critical section;
   determining a critical section is to be committed; and
   determining a critical section is to be aborted.

3. The apparatus of claim 1, wherein the first processing element speculative value includes a first processing element speculative shared coherency value to indicate the first processing element has speculatively read the first data entry, and wherein the first processing element non-speculative value includes a first processing element non-speculative shared coherency value to indicate the first data entry is in a first processing element non-speculative shared coherency state.

4. The apparatus of claim 1, wherein the first processing element speculative value includes a first processing element speculative exclusive coherency value to indicate the first processing element speculatively wrote the first data entry, and wherein the first processing element non-speculative value includes: (1) a first processing element non-speculative modified coherency value to indicate the first data entry is in a first processing element non-speculative modified coherency state in response to the end of the speculative execution event associated with the first processing element including a commit of a critical section associated with the first processing element, and (2) a first processing element non-speculative invalid coherency value to indicate the first data entry is in a first processing element non-speculative invalid coherency state in response to the end of the speculative execution event associated with the first processing element including an abort of a critical section associated with the first processing element.

5. The apparatus of claim 1, wherein the first state entry includes:
   a first number of storage cells to hold Modified, Exclusive, Shared and Invalid (MESI) bits to represent at least Modified, Exclusive, Shared and Invalid cache coherency states; and
   a second number of storage cells to hold speculative tracking bits to represent which of each processing element that shares access to the cache memory speculatively read from and speculatively wrote to the first data entry.

6. The apparatus of claim 5, wherein the first speculative port to transition the first state entry from the first processing element speculative value to a first processing element non-speculative value in one cycle in response to an end of speculative execution associated with the first processing element comprises the first speculative port to:
   read the first processing element speculative value from the first and the second number of storage cells in response to the end of speculative execution associated with the first processing element,
   modify the first processing element speculative value to the first processing element non-speculative value in response to at least the speculative tracking bits indicating the first processing element has speculatively read from or wrote to the first data entry, and
   write the first processing element non-speculative value to the first and second number of storage cells in one cycle in response to modifying the first processing element speculative value to the first processing element non-speculative value.

7. The apparatus of claim 1, wherein the first processing element is selected from a group consisting of a core, a hardware thread unit, and a software thread.

8. An apparatus comprising: a cache memory including:
a data array including a plurality of data entries;
a state array including a plurality of state entries to respectively correspond to the plurality of data entries, wherein the state array further comprises a coherency storage structure to hold a coherency state for respective ones of the plurality state entries, and a speculative storage structure to hold speculative values of the state entries;
a write port; and
a plurality of speculative ports respectively coupled to the plurality of state entries and including speculative algorithm logic to, in parallel, modify each of the plurality of state entries that includes a first thread speculative value to a first thread non-speculative value in response to an end speculative execution event associated with a first thread, wherein the first thread speculative value is to indicate that the first thread speculatively accessed a data entry, and to modify the coherency storage structure to hold a coherency value based on the first thread speculative value and the end speculation execution event, and to write the first thread non-speculative value to the speculative storage structure,
wherein the combination of the coherency value held in the coherency storage structure and the first thread non-speculative value held in the speculative storage structure forms the first thread non-speculative value.

9. The apparatus of claim 8, wherein the plurality of speculative ports include master-slave topologies, wherein a master portion of the plurality of speculative ports is to perform an evaluation of the first thread speculative value and to modify the first thread speculative value to the first thread non-speculative value, and wherein a slave portion of the plurality of speculative ports is to hold the first thread speculative value.

10. The apparatus of claim 8, wherein the speculative storage structure includes a read storage cell corresponding to each thread including a first thread that shares access to the cache memory and a write storage cell, wherein each read storage cell is to represent whether a speculative read of the data entry from a corresponding thread occurred and the write storage cell is to represent whether a speculative write to the data entry occurred.

11. The apparatus of claim 8, wherein the end speculation execution event includes encountering an end of a transaction instruction from a first thread and the speculative algorithm logic to modify the coherency storage structure to hold:
a shared coherency state value in response to the first thread speculative value indicating the first thread has speculatively read from the data entry and the end of the transaction instruction being from the first thread;
a modified coherency state value in response to the first thread speculative value indicating the first thread speculatively wrote to the data entry and the end of the transaction instruction includes a commit instruction from the first thread; and
an invalid coherency state value in response to the first thread speculative value indicating the first thread speculatively wrote to the data entry and the end of the transaction instruction includes an abort instruction from the first thread.

12. The apparatus of claim 11, wherein the speculative algorithm logic being to modify the coherency storage to hold a coherency value based on the first thread speculative value and the end speculation execution event further comprises: not modifying a read storage cell corresponding to the first thread in response to the end of the transaction instruction not being from the first thread.

13. The apparatus of claim 1, wherein the first speculative port includes a master-slave topology, wherein a master portion of the first speculative port is to perform an evaluation of the first processing element speculative value and to modify the first processing element speculative value to the first processing element non-speculative value, and wherein a slave portion of the first speculative port is to hold the first processing element speculative value.

14. A method comprising:
storing, within data storage of cache memory, a first data entry and a second data entry;
storing, within state storage of the cache memory associated with data storage, a first state entry to hold a first processing element speculative value to indicate a first processing element has speculatively accessed the first data entry and a second state entry to hold the first processing element speculative value to indicate the first processing element speculatively accessed the second data entry;
storing, within a coherency storage structure of the state storage, a coherency state for the first state entry and for the second state entry;
storing, within a speculative storage structure of the state storage, speculative values of the first state entry and for the second state entry;
executing, by a first speculative port coupled to the first state entry and by a second speculative port coupled to the second state entry, speculative algorithm logic to:
transition the first and second state entries from the first processing element speculative value to a first processing element non-speculative value in one cycle in response to an end of speculative execution event associated with a first processing element;
modify the coherency storage structure to hold a coherency value based on the first processing element speculative value and the end of speculation execution event; and
write the first processing element non-speculative value to the speculative storage structure, wherein the combination of the coherency value held in the coherency storage structure and the first processing element non-speculative value held in the speculative storage structure forms the first processing element non-speculative value.

15. The method of claim 14, wherein the first speculative port includes a master-slave topology, further comprising:
executing, by a master portion of the first speculative port, the algorithm speculative logic to perform an evaluation of the first processing element speculative value and to modify the first processing element speculative value to the first processing element non-speculative value; and
executing, by a slave portion of the first speculative port, the algorithm speculative logic to hold the first processing element speculative value while the master portion performs the evaluation of the first processing element speculative value and modifies the first processing element speculative value to the first processing element non-speculative value.

16. The method of claim 14, wherein the first processing element speculative value includes a first processing element speculative shared coherency value to indicate the first processing element has speculatively read the first data entry, and wherein the first processing element non-speculative value includes a first processing element non-speculative shared coherency value to indicate the first data entry is in a first processing element non-speculative shared coherency state.

17. The method of claim 14, wherein the first processing element speculative value includes a first processing element speculative exclusive coherency value to indicate the first processing element speculatively wrote the first data entry, and wherein the first processing element non-speculative value includes: (1) a first processing element non-speculative modified coherency value to indicate the first data entry is in a first processing element non-speculative modified coherency state in response to the end of the speculative execution event associated with the first processing element including a commit of a critical section associated with the first processing element, and (2) a first processing element non-speculative invalid coherency value to indicate the first data entry is in a first processing element non-speculative invalid coherency state in response to the end of the speculative execution event associated with the first processing element including an abort of a critical section associated with the first processing element.

18. The method of claim 14, wherein the first state entry includes:
   a first number of storage cells to hold Modified, Exclusive, Shared and Invalid (MESI) bits to represent at least Modified, Exclusive, Shared and Invalid cache coherency states; and
   a second number of storage cells to hold speculative tracking bits to represent which of each processing element that shares access to the cache memory has speculatively read from and speculatively wrote to the first data entry.

19. The method of claim 18, wherein executing the speculative algorithm logic by the first speculative port to transition the first state entry from the first processing element speculative value to a first processing element non-speculative value in one cycle in response to an end of speculative execution associated with the first processing element comprises:
   reading the first processing element speculative value from the first and the second number of storage cells in response to the end of speculative execution associated with the first processing element,
   modifying the first processing element speculative value to the first processing element non-speculative value in response to at least the speculative tracking bits indicating the first processing element has speculatively read from or wrote to the first data entry, and
   writing the first processing element non-speculative value to the first and second number of storage cells in one cycle in response to modifying the first processing element speculative value to the first processing element non-speculative value.

20. The method of claim 14, wherein the end of speculative execution event associated with the first processing element includes an event selected from a group consisting of:
   encountering a commit critical section operation to commit speculative execution of a critical section;
   encountering an abort operation to abort speculative execution of a critical section;
   detecting an asynchronous abort event to abort speculative execution of the critical section;
   determining a critical section is to be committed; and
   determining a critical section is to be aborted.

21. The method of claim 14, wherein the first processing element is selected from a group consisting of a core, a hardware thread unit, and a software thread.

* * * * *